Nov. 26, 1935.   I. H. JUDD   2,022,375
TRANSPORTATION OF AUTOMOBILES
Filed April 16, 1934   3 Sheets-Sheet 1
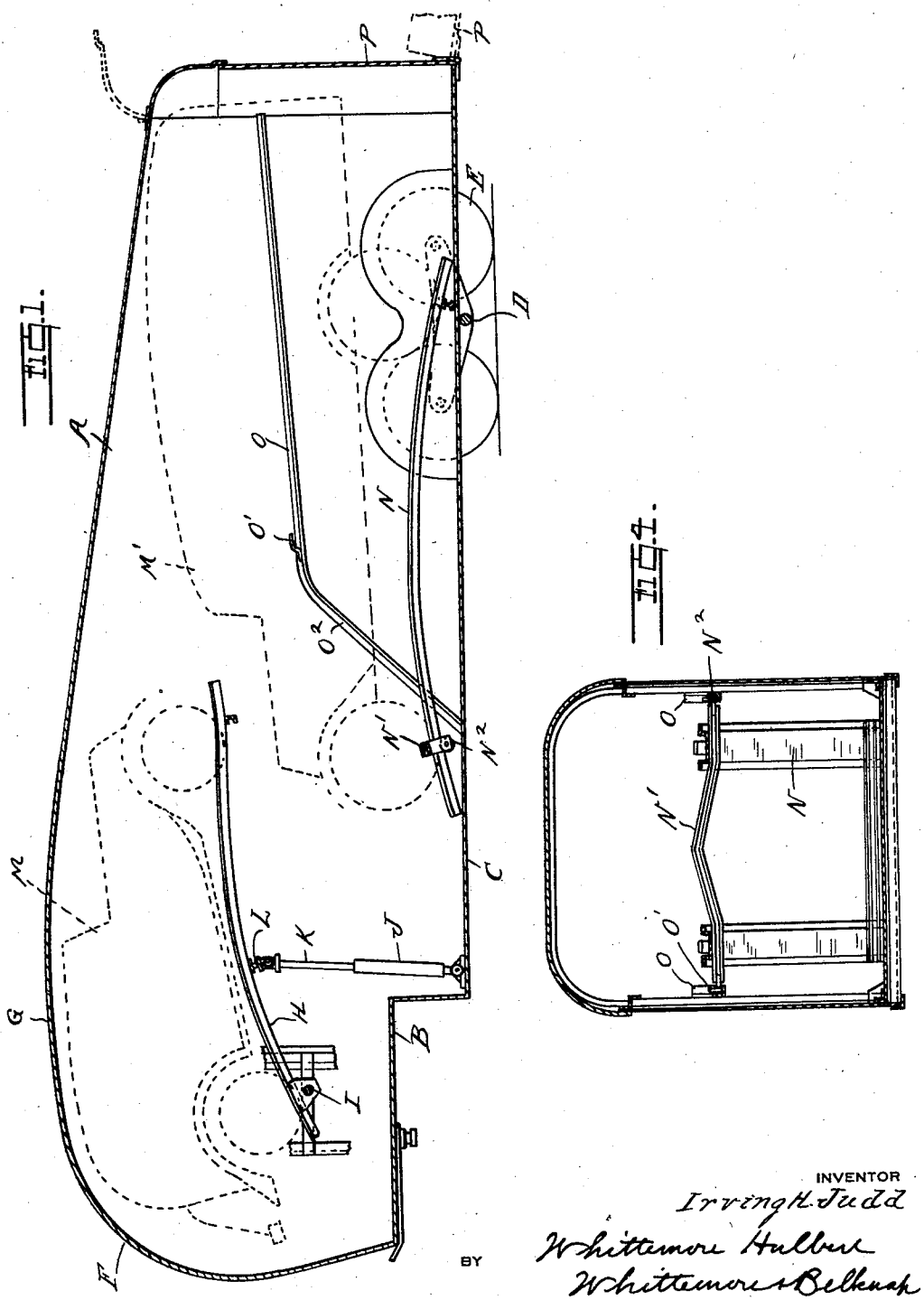
INVENTOR
Irving H. Judd
BY Whittemore Hulbert
Whittemore & Belknap
ATTORNEYS

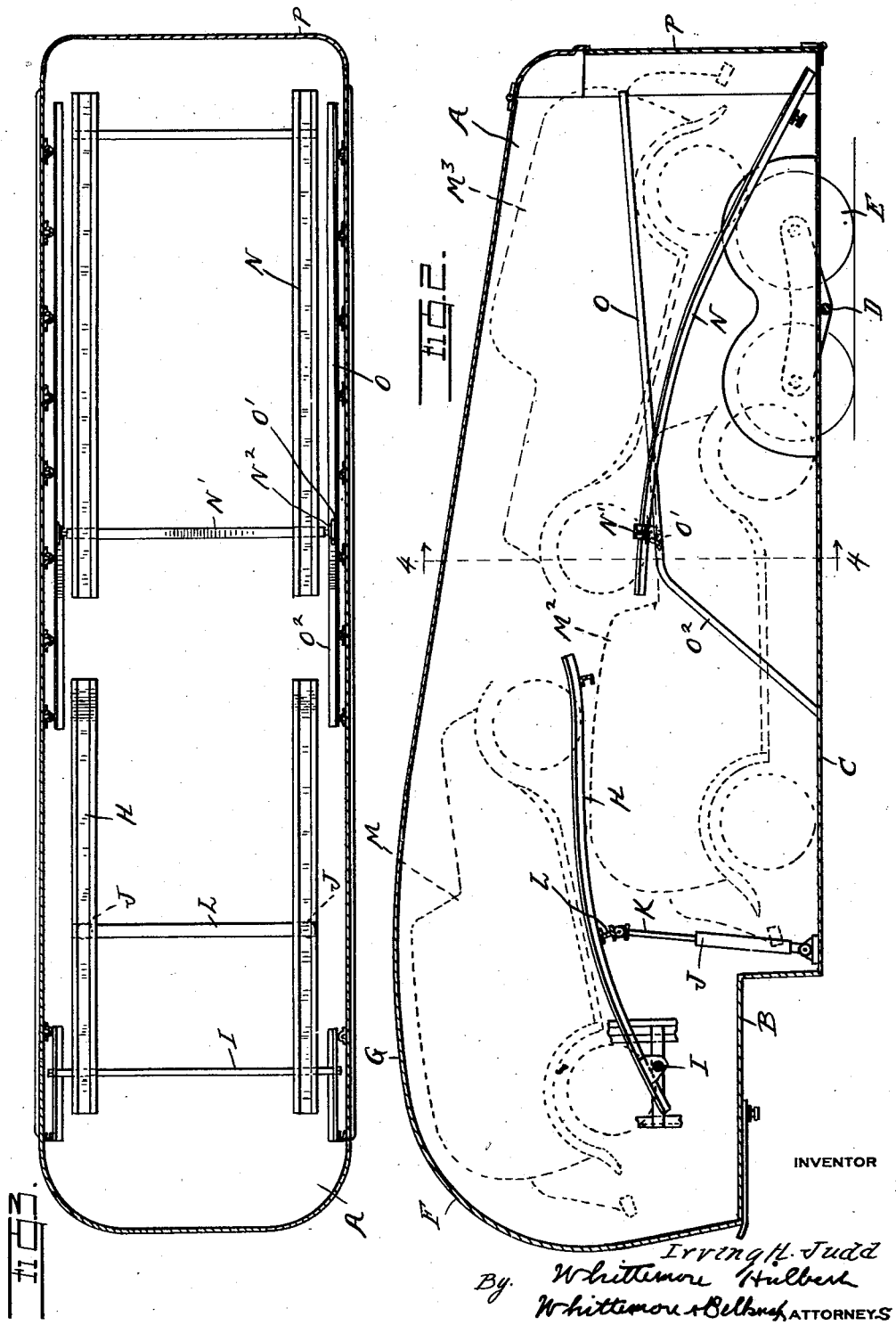

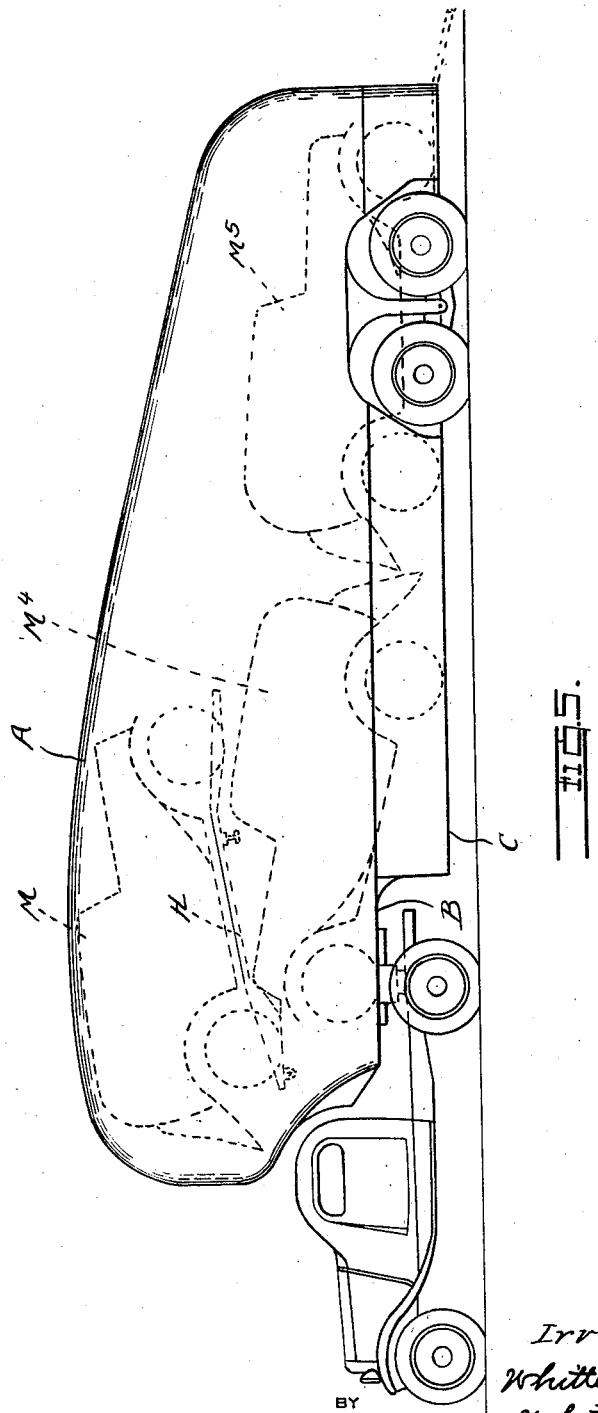

Patented Nov. 26, 1935

2,022,375

UNITED STATES PATENT OFFICE 2,022,375

TRANSPORTATION OF AUTOMOBILES

Irving H. Judd, Detroit, Mich., assignor to Whitehead & Kales Company, River Rouge, Mich., a corporation of Michigan Application April 16, 1934, Serial No. 720,879

4 Claims. (Cl. 280—33.1)

The invention relates to the highway transportation of motor vehicles by loading the same in a plurality of tiers on a wheeled transport vehicle. Among other things, the invention relates to various methods of loading automobiles upon a vehicle adapted for their transportation. More particularly the invention relates to the carrying of the automobiles in enclosed and covered transports in which they are thoroughly protected from the weather and from the dust of the road. In the construction of such covered transport vehicles it is necessary to maintain the dimensions within fixed limitations, such as are imposed by highway regulation and it is also desirable to form the enclosure with only sufficient space therein for receiving the automobiles when loaded. This however, involves the problem of loading, so that the positioning of one of the automobiles within the enclosure will not interfere with the introduction of the others.

It is the object of the present invention to obtain a construction of such covered transport and a method of loading the same which facilitates easy introduction of the automobiles successively therein and which permits of reducing the enclosed space to a minimum. With these objects in view the invention consists in the construction and the method as hereinafter set forth.

In the drawings:

Fig. 1 is a diagrammatic vertical longitudinal section through the trnsport showing one storage arrangement of vehicles therein;

Fig. 2 is a view similar to Fig. 1 showing a different storage arrangement;

Fig. 3 is a horizontal section;

Fig. 4 is a cross section on line 4—4, Fig. 2.

Fig. 5 is an elevation of a transport and truck for drawing the same showing in dotted lines another arrangement of cars therein.

Automobile transports are usually constructed as a trailer, the forward portion of which overlaps and is pivotally connected to a track platform. This limits the vertical dimension of the forward part of the transport which is above said truck platform. It is customary, however, to arrange the forward car within the enclosure with its front end in this limited space, its rear end being arranged in the portion of increased vertical dimension which is in rear of the truck. This may be advantageous where the upper tier of cars is not within the enclosure, for there would then be nothing to interfere with the loading of said cars above the top of the enclosure. On the other hand, where both lower and upper tier cars are enclosed, such an arrangement is not desirable. With my improved fully enclosed construction of transport I have reversed the usual arrangement, placing the rear end of the forward upper tier car in the portion which is above the truck platform and elevating the front end of said car which faces to the rear, to provide thereunder space for a lower tier car. As a result of such arrangement the enclosing body of the transport may be given a tapering or streamlined form, reducing the amount of surface exposed to the wind and also reducing to the minimum the enclosed volume containing the loaded cars.

More in detail, A is the enclosed body of the transport which is provided with the usual upwardly stepped forward portion B for overlapping the truck platform and the dropped portion C supported near its rear end upon an axle D and tandem wheels E. The forward end of this body is rounded as indicated at F, the roof sloping upward therefrom to a point G slightly in rear of the stepped portion B and then tapering downward toward the rear end.

The specific construction of this transport does not form the subject matter of the present application and I will therefore only generally describe the elements which are necessary to the introduction and storage of the automobiles within the enclosure. These include track members H which are pivotally mounted on a cross shaft I above the stepped portion B and at a point which gives sufficient clearance above said shaft for the rear end of an automobile body. The shaft I is suitably supported at its opposite ends upon the sides of the body so as to carry the load resting thereon. The tracks H are spaced to receive the wheels of the automobile and are of a channel cross section to form guide flanges on opposite sides of the wheels. The length of the tracks H is sufficient for receiving both forward and rear wheels of an automobile and in initial position the rear ends of said tracks rest upon the floor of the transport to form an incline on to which an automobile may be run.

A pair of hydraulic jacks having cylinders J pivotally supported on the floor of the transport and pistons K connected to a cross beam L secured to the tracks intermediate their ends are preferably used to raise the rear ends of the tracks relative to the floor of the transport. Thus after a car such as M has been backed up the incline formed by the tracks H with its rear end toward the forward end of the transport, these tracks are then elevated by the jacks so as to arrange the car as indicated in dotted lines, Fig. 1. The elevation of the tracks is sufficient to provide thereunder clearance for a portion of a second motor vehicle M' which may be driven in through the rear end of the enclosed body and into the position shown in dotted lines, Fig. 1. In this figure the second motor vehicle is shown as a truck which occupies the entire rear portion of the enclosed body while its forward end extends beneath the elevated automobile as previously described. In Fig. 2 the second car loaded is an automobile which is backed into the transport so that its rear end is beneath the elevated forward end of the car M, as indicated at $M^2$. The front end of this second car is sufficiently below the top of the covered transport for the reception of a third car $M^3$. This is run up an incline formed by tracks N which are supported on opposite sides of the transport and which are preferably of a longitudinally bowed form. These tracks if permanently positioned would interfere with the running in of the second car and therefore the rear ends of the tracks are connected to and supported upon a trolley frame N' having the wheels $N^2$ thereof engaging permanent tracks O arranged on opposite sides of the transport. The tracks O extend from the rear end of the transport to the point for supporting the upper ends of the tracks N at which point a hooked stop O' is arranged for holding the wheels $N^2$ from displacement. Beyond this point the tracks O have portions $O^2$ inclining downwardly to the floor of the transport, the arrangement being such that by lifting the trolley frame N' so as to disengage the wheels $N^2$ from the stops O' and to place them upon the opposite sides of said stops. The frame may be lowered over the inclined portions $O^2$ so as to rest upon the floor. This is the position shown in Fig. 1 where the tracks N form a runway over which the second car M' is driven. With the three car loading as shown in Fig. 2, the tracks N connected to and supported on the trolley frame N' are drawn rearward until the wheels $N^2$ reach the rear end of the permanent tracks O, where the frame N may be lifted off and placed upon the floor of the transport at the rear end thereof. Thus the tracks N will form a skid over which the first and second cars may be driven on to the transport and after the loading of the second car the frame N' is again lifted to engage the wheels $N^2$ with the tracks O and the tracks N are moved forward into the position shown in full lines in Fig. 2. Here they serve as a runway for the third car which is driven thereover and is arranged with its forward end over the hood of the second car and its rear end just clearing the top of the transport.

It should be understood that the cars when placed in position are secured by the usual clamping devices (not shown) and after all the cars are loaded the rear end of the transport is closed by an end gate P. This is preferably hinged to the rear end of the floor of the transport so that when opened it may serve as a skid or runway over which the last car of the three car loading may be run. Also where the tracks N are lowered on the floor of the transport as shown in Fig. 1, the tail gate P may form the skid for loading both cars.

In Fig. 5 another modification in the arrangement of cars within the transport is illustrated. In this the second car $M^4$ is moved over the floor of the transport to the position illustrated by dotted lines in Figure 5, so that its forward wheels are above the step B but below the first car on the elevated tracks H and its rear wheels are upon the dropped portion C of the transport. Thus the second car is further forward within the transport than in the other arrangements and provides sufficient room in rear thereof for a third car $M^5$ resting upon the floor. Preferably this third automobile $M^5$ is backed into the transport until it is endwardly adjacent the second automobile $M^4$, however if desired, it may be driven forwardly instead of backed into the transport until it is endwardly adjacent the second automobile $M^4$.

What I claim as my invention is:

1. The method of loading cars upon a motor vehicle transport comprising backing an automobile thereon from the rear to the forward end and up inclined tracks at said forward end, raising the rear ends of said tracks so that the front wheels of the automobile are higher than the rear wheels thereof, backing a second automobile on to the transport with its rear end extending beneath the front wheels and front portion of the first car, and driving a third car over inclined tracks with its forward end overlapping the hood portion of the second car.

2. In a method of loading automobiles on a vehicle for their transport, the steps which consist of first moving an automobile forwardly over the floor of the vehicle to the forward end thereof so that the lower portion of said automobile is toward the center of the vehicle, then elevating the set of wheels at the end of its lower portion in respect to the set of wheels at the end of its higher portion, then moving a second automobile over the floor of the vehicle toward the front thereof below the elevated set of wheels at the end of the lower portion of said first mentioned automobile, and then moving a third automobile on an incline to a position above the lower portion of said second automobile.

3. In a method of loading three automobiles on a semi-trailer adapted to be supported at its forward end upon a pulling vehicle, the steps which consist in; first, moving over the floor of the semi-trailer to the forward end thereof an automobile with its higher portion toward the forward end of said semi-trailer to a position such that the set of wheels at the end of its higher portion is elevated with respect to the set of wheels at the end of its lower portion; second, elevating the lower portion of said automobile to a position sufficiently above the floor of said semi-trailer to permit placing the higher portion of another automobile substantially therebelow; third, moving a second automobile upon the floor of said semi-trailer to a position such that its higher portion is toward the forward end of the semi-trailer and substantially below the lower portion of said first placed automobile; fourth, disposing movable means at the rear of said semi-trailer in a position adapted to support a third automobile with its higher portion overlapping the lower portion of said second automobile; and, fifth, moving a third automobile upon said movable means endwardly adjacent the lower portion of said first placed automobile, with the set of wheels at the end thereof toward the rear end of the semi-trailer depressed with respect to the set of wheels at the end thereof toward the forward end of the semi-trailer.

4. In a method of loading three automobiles on a semi-trailer adapted to be supported at its forward end upon a pulling vehicle, the steps which consist in; first, moving over the floor of the semi-trailer to the forward end thereof an automobile with its higher portion toward the forward end of said semi-trailer to a position such that the set of wheels at the end of its higher portion is elevated with respect to the set of wheels at the end of its lower portion; second, elevating the lower portion of said automobile to a position sufficiently above the floor of said semi-trailer to permit placing the higher portion of another automobile substantially therebelow; third, moving a second automobile upon the floor of said semi-trailer to a position such that its higher portion is toward the forward end of the semi-trailer and substantially below the lower portion of said first placed automobile; fourth, disposing movable means at the rear of said semi-trailer in a position adapted to support a third automobile with its higher portion overlapping the lower portion of said second automobile; and, fifth, moving a third automobile upon said movable means with its lower portion endwardly adjacent the lower portion of said first placed automobile and with the set of wheels at the end of its higher portion depressed with respect to the set of wheels at the end of its lower portion.

IRVING H. JUDD.